Patented Mar. 7, 1944

2,343,524

UNITED STATES PATENT OFFICE 2,343,524

PROCESS OF PREPARING MORPHOLINE SULPHIDES

Edward S. Blake, Nitro, W. Va., assignor to Monsanto Chemical Company, St. Louis, Mo., a corporation of Delaware No Drawing. Application February 17, 1940, Serial No. 319,480

5 Claims. (Cl. 260—247)

This invention relates to new organic compounds and the preparation of the same.

An object of the invention is to provide new and valuable compounds useful for improving the properties of gasoline, lubricating oils, rubber and the like and more particularly to provide valuable derivatives of morpholine wherein the heterocyclic nitrogen atom is linked to sulphur to form a morpholine sulphide. A further object is to provide a method for the preparation of morpholine sulphides. Still other objects are to provide new compositions of matter and to advance the art. Other objects will hereinafter appear.

These objects may be accomplished according to the present invention which comprises treating morpholine with a sulphur halide to form a product of the probable structural formula

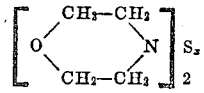

where $x$ is an integer. In place of morpholine itself substituted morpholines may be employed so long as the heterocyclic nitrogen atom remains unsubstituted. For example the sulphides of methyl and ethyl substituted morpholines are within the scope of this invention.

From the standpoint of economy and ready availability a sulphur chloride is preferred, although it is obvious that a sulphur bromide, for example, could likewise be employed. The reaction is conveniently carried out in an inert organic solvent employing sufficient morpholine to neutralize the hydrogen halide liberated in the reaction, but it is to be understood that the invention is not limited to this preferred procedure. Thus, the reaction may be carried out in the absence of solvent and other means of removing hydrogen halide may be employed. However, unless some means are provided to neutralize the acid by-product the yields are materially reduced so that it is preferred to employ either an excess of morpholine or other basic ingredient such as sodium carbonate. Where an excess of morpholine is employed for this purpose, the morpholine salt formed being more or less insoluble in organic solvents may be separated from a solution of the morpholine sulphide by filtering, decanting or the like and any residual contamination removed, after removal of the solvent by washing the product with water. The morpholine may of course be recovered from the salt and utilized in subsequent reactions.

When morpholine is reacted with a sulphur monohalide in accordance with this invention, morpholine disulphide is formed in excellent yield. For example, 174 parts by weight of morpholine (substantially 2.0 molecular proportions) were dissolved in ether and to the solution so prepared 67.5 parts by weight (substantially 0.5 molecular proportion) of sulphur monochloride in ether was added gradually with stirring and cooling. As the reaction is strongly exothermic it is desirable to maintain the temperature below substantially 30° C. in order to prevent loss of solvent. After the reaction was complete the solution was filtered from precipitated morpholine hydrochloride, the ether removed, and the residue washed repeatedly with water and dried in an oven at 70° C. A 98.3% of theory yield of morpholine disulphide, a white crystalline product melting at 121–124° C. was obtained. Analysis gave 26.04% sulphur and 11.86% nitrogen as compared to 27.11% sulphur and 11.86% nitrogen, calculated for morpholine disulphide.

The morpholine disulphides take up additional sulphur upon heating therewith to form higher sulphides of more or less indefinite composition. For example substantially 0.1 molecular proportion of morpholine disulphide reacts with substantially 0.2 atomic weight proportion of sulphur at 110–130° C. to form what is believed to be a polysulphide. A morpholine monosulphide on the other hand may be prepared by reacting morpholine with sulphur dichloride. The latter is readily prepared from sulphur monochloride by introducing chlorine gas at −10° C. into sulphur monochloride containing a small amount of charcoal until the theoretical weight of chlorine has been absorbed (Pope and Heycock, British Patent 142,879). An ether solution of substantially one molecular proportion of sulphur monochloride added to an ether solution of substantially four molecular proportions of morpholine following the procedure described above resulted in a good yield of morpholine monosulphide, a white crystalline product melting at 124–126° C. Analysis gave 15.79% sulphur and 13.76% nitrogen as compared to 15.68% sulphur and 13.72% nitrogen calculated for morpholine monosulphide.

It is to be understood that the invention is not limited to the examples set forth above which are intended only to describe specific means for carrying out the invention. Excellent results have been obtained with other inert organic solvents in place of ether as described above, as for example carbon tetrachloride. Benzene petroleum ether and the like may also be employed. Numerous modifications of the details set forth above will be apparent to those skilled in the art to which this invention pertains. Accordingly this invention is limited solely by the appended claims.

What is claimed is:

1. A morpholine sulphide wherein the heterocyclic nitrogen atoms of two molecules of a morpholine are joined through at least one intervening sulphur atom.

2. A morpholine sulphide of the probable structural formula

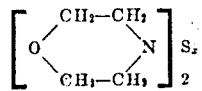

where $x$ is an integer.

3. Morpholine monosulphide.
4. Morpholine disulphide.
5. Morpholine polysulphide.

EDWARD S. BLAKE.